(12) United States Patent
Karlsson et al.

(10) Patent No.: US 10,067,867 B2
(45) Date of Patent: Sep. 4, 2018

(54) PERFORMING GARBAGE COLLECTION ON AN OBJECT ARRAY USING ARRAY CHUNK REFERENCES

(71) Applicant: Oracle International Corporation, Redwood City, CA (US)

(72) Inventors: Stefan Mats Rikard Karlsson, Nacka (SE); Per A. Liden, Stockholm (SE)

(73) Assignee: Oracle International Corporation, Redwood City, CA (US)

( * ) Notice: Subject to any disclaimer, the term of this patent is extended or adjusted under 35 U.S.C. 154(b) by 84 days.

(21) Appl. No.: 15/267,660

(22) Filed: Sep. 16, 2016

(65) Prior Publication Data

US 2018/0011787 A1 Jan. 11, 2018

Related U.S. Application Data

(60) Provisional application No. 62/360,854, filed on Jul. 11, 2016.

(51) Int. Cl.
*G06F 12/02* (2006.01)
*G06F 3/06* (2006.01)
*G06F 8/41* (2018.01)

(52) U.S. Cl.
CPC ........ *G06F 12/0253* (2013.01); *G06F 3/0619* (2013.01); *G06F 3/0665* (2013.01); *G06F 3/0689* (2013.01); *G06F 8/41* (2013.01); *G06F 2212/1016* (2013.01)

(58) Field of Classification Search
CPC ......... G06F 12/0253; G06F 2212/1016; G06F 3/0619; G06F 3/0665; G06F 3/0689; G06F 8/41
See application file for complete search history.

(56) References Cited

U.S. PATENT DOCUMENTS 8,838,877 B2   9/2014   Wakrat

*Primary Examiner* — Yong Choe
(74) *Attorney, Agent, or Firm* — Invoke

(57) ABSTRACT

Techniques for performing garbage collection on an object array using array chunk references is described. A garbage collector (GC) thread identifies an object array to be processed. The GC thread divides the object array into array chunks. The GC thread generates array chunk references corresponding respectively to the array chunks. Each array chunk reference comprises: (a) chunk start bits representing a memory address of a start of a corresponding array chunk, and (b) chunk length bits representing a chunk length of the corresponding array chunk. The GC thread pushes the array chunk references onto the processing stack. A single processing stack concurrently stores multiple array chunk references, associated with a same object array. One or more of the array chunk references, that are associated with the same object array and stored on the processing stack, may be distributed to other GC threads for processing.

21 Claims, 14 Drawing Sheets

Ordinary Reference
602

| Metadata and/or Other Bits 612 | Address Bits 616 |
|---|---|

Chunk Flag 622

Array Chunk Reference
604

| Chunk Start Bits 618 | Chunk Length Bits 620 | Chunk Flag 622 |
|---|---|---|

PERFORMING GARBAGE COLLECTION ON AN OBJECT ARRAY USING ARRAY CHUNK REFERENCES

BENEFIT CLAIM; RELATED APPLICATION; INCORPORATION BY REFERENCE

This application claims the benefit of U.S. Provisional Patent Application 62/360,854, filed Jul. 11, 2016, which is hereby incorporated by reference.

Further, this application relates to U.S. Provisional Patent Application No. 62/307,062, filed Mar. 11, 2016, which is hereby incorporated by reference.

TECHNICAL FIELD

The present disclosure relates to garbage collection. In particular, the present disclosure relates to performing garbage collection on an object array using array chunk references.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. PERFORMING GARBAGE COLLECTION ON AN OBJECT ARRAY USING ARRAY CHUNK REFERENCES
5. EXAMPLE EMBODIMENT
6. MISCELLANEOUS; EXTENSIONS
7. HARDWARE OVERVIEW

1. General Overview

One or more embodiments include performing garbage collection on an object array using array chunk references. A garbage collector (GC) thread identifies an object array to be processed. The GC thread divides the object array into array chunks. The GC thread generates array chunk references corresponding respectively to the array chunks. Each array chunk reference comprises: (a) chunk start bits representing a memory address of a start of a corresponding array chunk, and (b) chunk length bits representing a chunk length of the corresponding array chunk. The GC thread pushes the array chunk references onto the processing stack. A single processing stack concurrently stores multiple array chunk references, associated with a same object array. One or more of the array chunk references, that are associated with the same object array and stored on the processing stack, may be distributed to other GC threads for processing. One array chunk may be distributed to one GC thread at the same time as another array chunk is distributed to another GC thread. The array chunk references may be distributed to other GC threads for load balancing purposes.

In one or more embodiments, an array chunk reference comprises: (a) chunk start bits, (b) chunk length bits, and (c) a chunk flag. Chunk start bits store a compressed version of the memory address of the start of the array chunk. Chunk length bits store a compressed version of a chunk length of an array chunk. Due to various compressions used in the chunk start bits and the chunk length bits, the length of the array chunk reference is within the maximum length of an entry on the processing stack, which may be, for example, 64 bits.

One or more embodiments described in this Specification and/or recited in the claims may not be included in this General Overview section.

2. Architectural Overview

Figure 1:
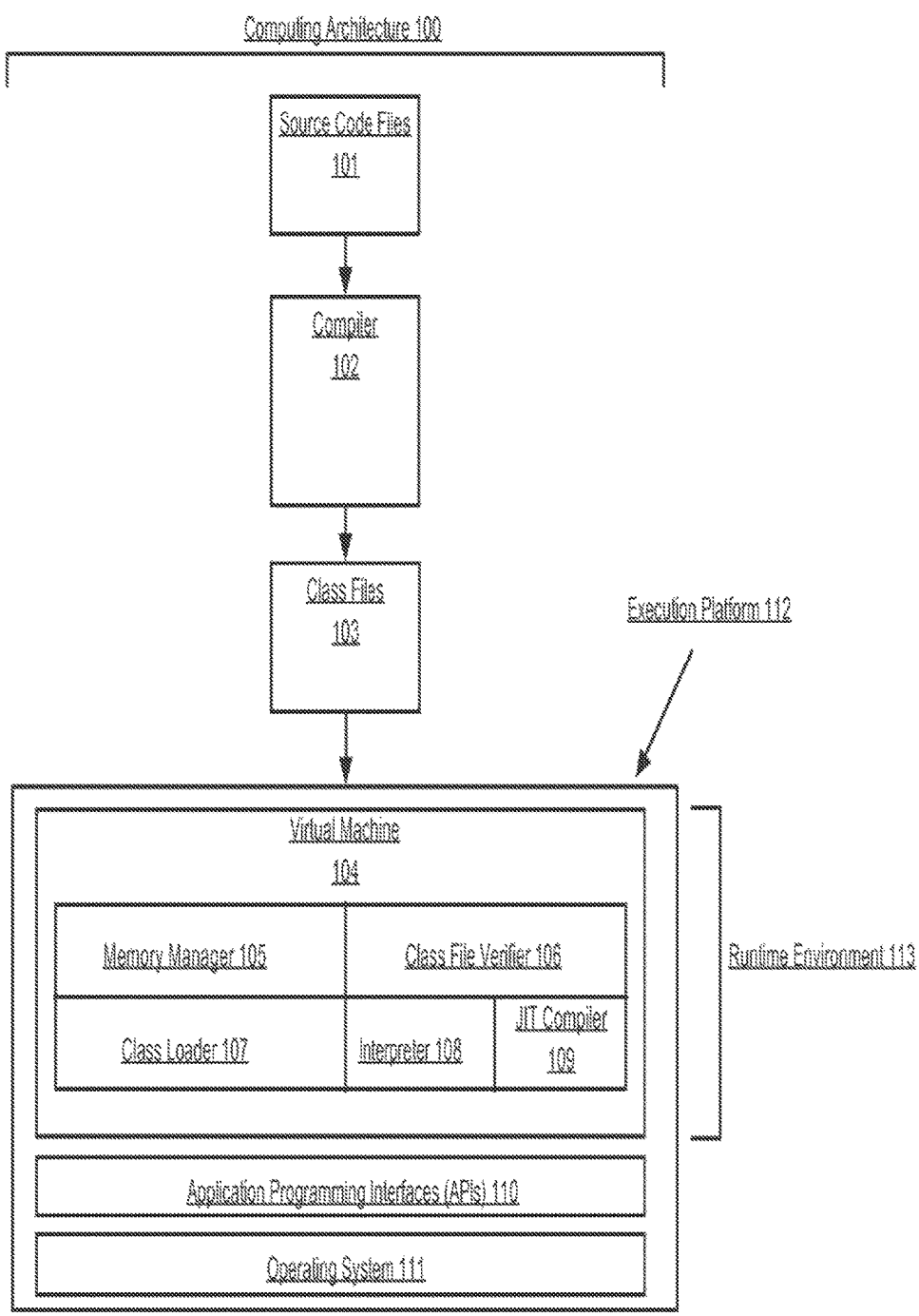
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
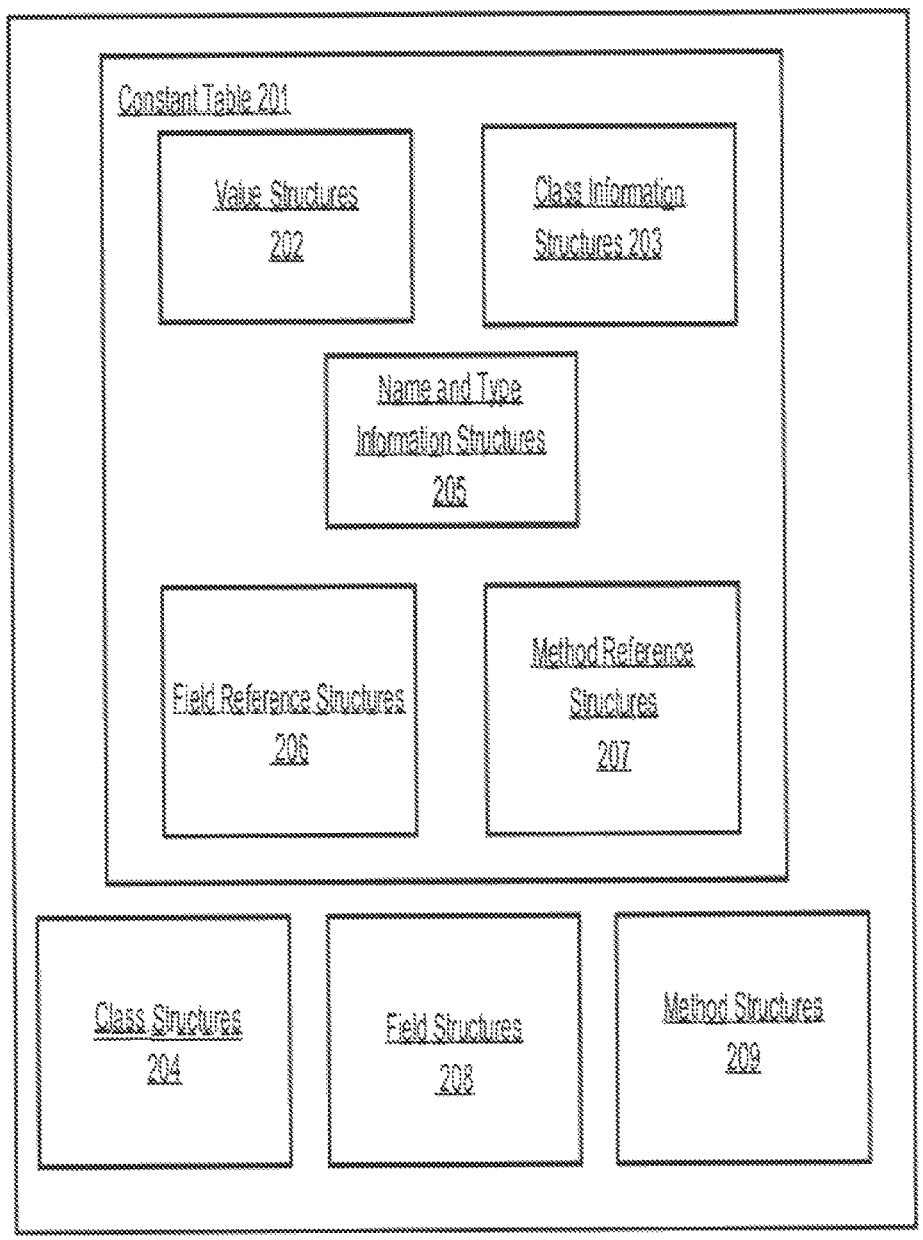
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add 12and 13 is defined in class A, takes no parameters, and returns an integer. The body of method add 12and 13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment 113 and allocated concrete memory locations.

2.2 Example Virtual Machine Architecture

Figure 3:
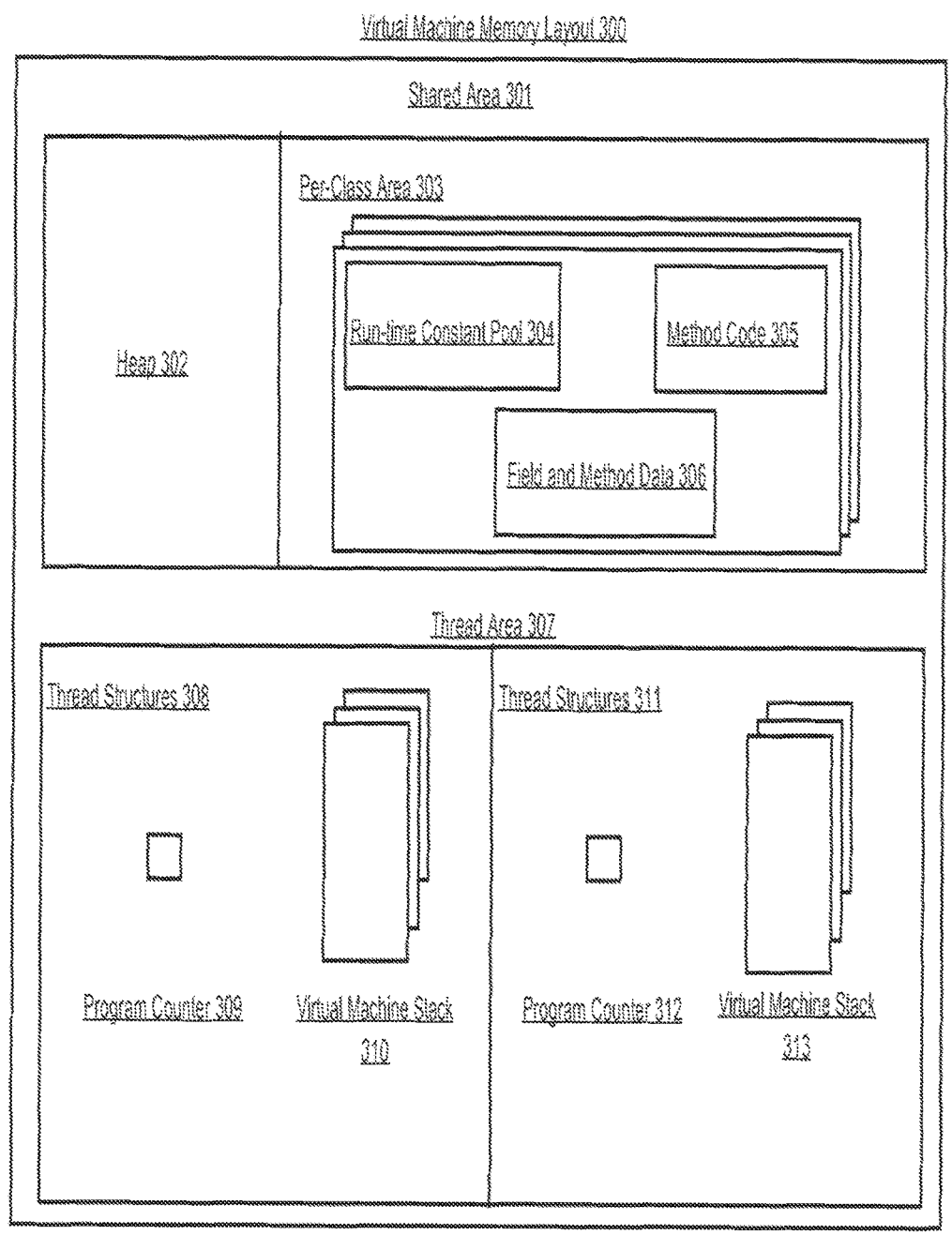
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
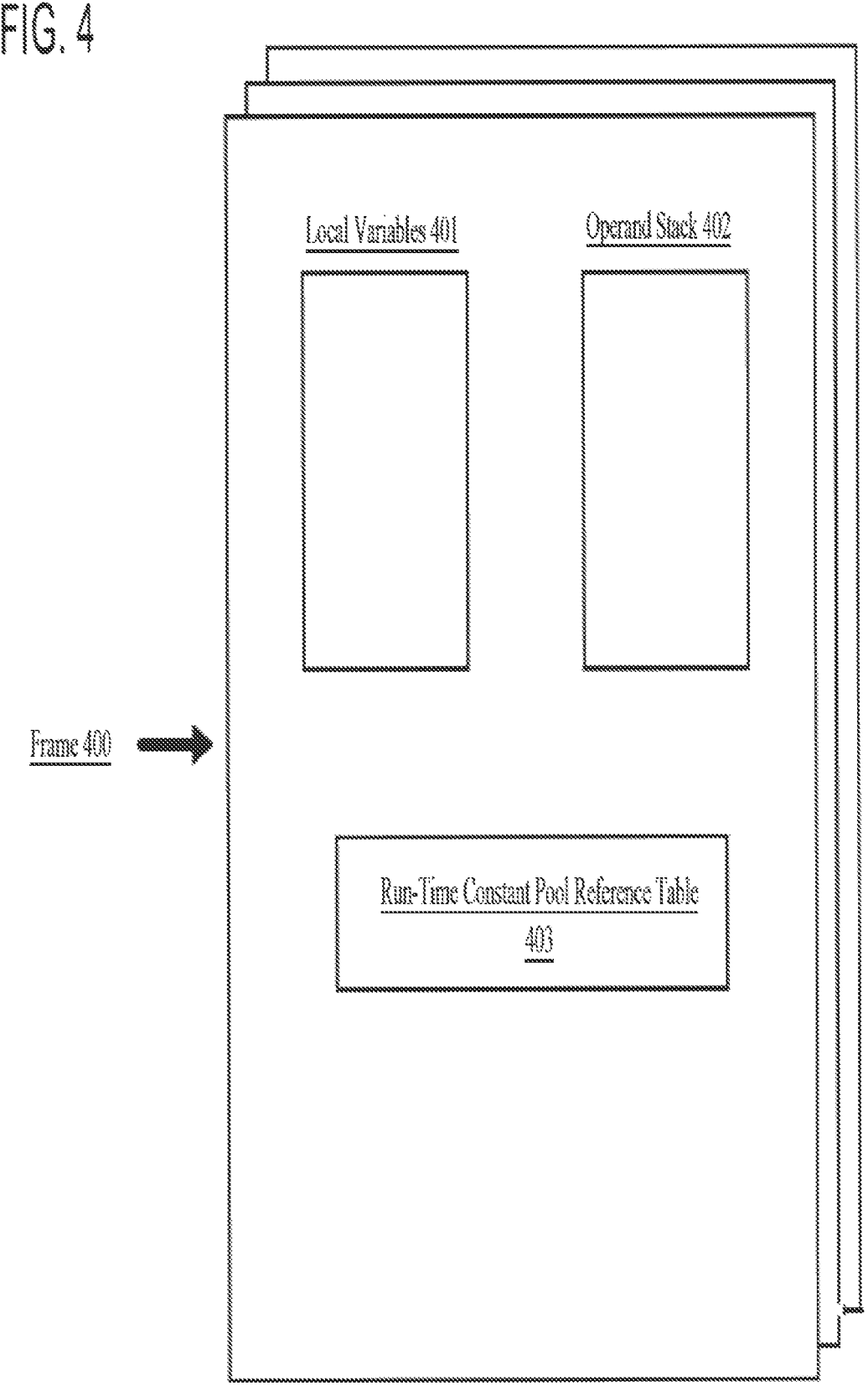
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking a class loader 107 which loads an initial class. Examples of class loaders 107 include a boot class loader, an extension class loader, and an application class loader. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
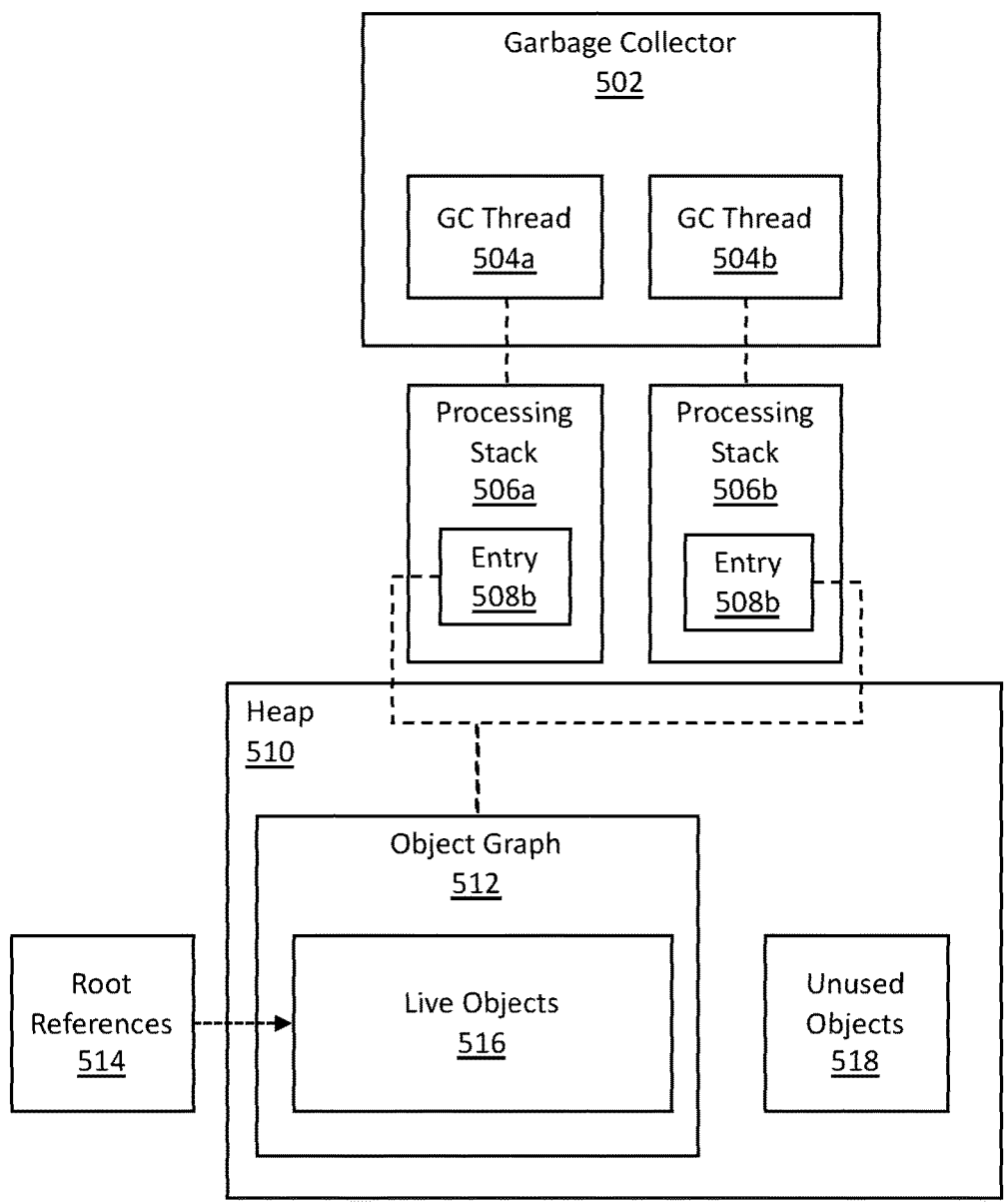
FIG. 5 illustrates an example garbage collection system for processing objects in a heap, in accordance with an embodiment.

FIG. 5 illustrates an example garbage collection system for processing objects in a heap, in accordance with an embodiment. FIG. 5 includes garbage collector (GC) 502, GC threads 504*a*-*b*, processing stacks 506*a*-*b*, entries 508*a*-*b*, heap 510, object graph 512, root references 514, live objects 516, and unused objects 518.

As described above, a heap 510 (or heap 302 described above) represents the run-time data area from which memory for class instances and arrays is allocated. The heap 510 stores objects that are created during execution of a program. The heap 510 stores both live objects 516 and unused objects 518.

An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects. An object array is explicitly created by an array creation expression. The length of the object array is established when the object array is created and is thereafter fixed. Each element or item in the object array is accessed by a numerical index, beginning with the index zero (0). As an example, a program may include the following pseudo-code:

```
String myobject = "11/15/2011";
String[ ] myarray = new String[2];
myarray[0] = "11/16/2011";
myarray[1] = "11/17/2011";
```

In this example, myobject is a normal object whose type is String and whose value is "11/15/2011." Further, myarray is an object array that holds two elements, each of which is associated with a type of String.myarray is a set of two normal object references whose type is String. The value of the object referenced by the first element is "11/16/2011." The value of the object referenced by the second element is "11/17/2011."

In an embodiment, an object graph 512 is a graph including nodes and edges. A node represents a live object 516. An edge represents a reference from one live object 516 to another live object 516. The root nodes of the object graph 512 include objects pointed to by root references 514. The remaining nodes of the object graph 512 include objects pointed to by another live object.

In an embodiment, a root reference 514 is a pointer to an object from which a traversal of an object graph 512 begins. A garbage collector 502 begins traversing an object graph 512 at a particular object referenced by a root reference 514. The garbage collector 502 identifies the particular object as a live object 516. The garbage collector 502 traces the particular object to identify other objects referenced by the particular object. The garbage collector 502 identifies the other objects referenced by the particular object as live objects 516. The root references 514 used by a garbage collector 502 may be determined by analyzing registers, global fields, and stack frames at the moment when a garbage collection process is triggered. Examples of objects referenced by root references 514 include a class loaded by an application class loader, a live thread (such as thread structures 308-311), and a local variable or parameter (such as local variables 401 and/or operand stack 402).

In an embodiment, a live object 516 (also referred to as an "in use object") refers to an object that is currently being referenced by an executing program. The program includes at least one reference to the live object 516. A live object 516 is an object that is reachable from an object referenced by a root reference 514.

In an embodiment, an unused object 518 (also referred to as an "unreferenced object" or a "dead object") refers to an object that is no longer referenced by any part of the executing program. The unused object 518 may be removed from memory. The memory originally used to store the unused object 518 may be reclaimed to store new live objects 516.

In one or more embodiments, a garbage collector 502 refers to hardware and/or software configured to identify and remove unused objects 518 stored in a heap 510. The garbage collector 502 may perform a garbage collection process at a scheduled interval and/or upon an event trigger. As an example, when a heap (or a region thereof) reaches a threshold value, the garbage collector 502 may perform a garbage collection process to remove unused objects 518 stored at the heap (or a region thereof).

A garbage collector 502 may include one or more GC threads 504a-b to perform operations in parallel. A GC thread identifies live objects 516 by tracing through an object graph 512. After identifying live objects 516, the GC thread performs various operations and/or algorithms to remove unused objects 518. Specific operations performed in removing unused object depends on the type of garbage collector 502 used.

As an example, one type of garbage collector 502 is a copying collector. The copying collector uses two separately defined address space of the heap, referred to as a "from-space" and a "to-space." The copying collector identifies live objects 516 stored within an area defined as a from-space. The copying collector copies the live objects 516 to another area defined as a to-space. After all live objects 516 are copied from the from-space to the to-space, the area defined as the from-space is reclaimed. New memory allocation may begin at the first location of the original from-space.

As another example, another type of garbage collector 502 is a mark-and-sweep collector. The mark-and-sweep collector utilizes at least two phases: a mark phase and a sweep phase. During the mark phase, the mark-and-sweep collector marks each live object 516 with a "live" bit. The live bit may be, for example, a bit within an object header of the live object 516. During the sweep phase, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

The mark-and-sweep collector may be implemented as a parallel collector. The parallel collector includes multiple GC threads 504a-b working in parallel through the mark and sweep phases.

Additionally or alternatively, the mark-and-sweep collector may be implemented as a concurrent collector. At least some operations of a concurrent collector are performed while the executing program or application continues to run. Example stages of a concurrent collector include:

Stage 1: Identify the objects referenced by root references (this is not concurrent with the executing program)

Stage 2: Mark reachable objects from the objects referenced by the root references (this is concurrent)

Stage 3: Identify objects that have been modified as part of the execution of the program during Stage 2 (this is concurrent)

Stage 4: Re-mark the objects identified at Stage 3 (this is not concurrent)

Stage 5: Sweep the heap to obtain free lists and reclaim memory (this is concurrent)

As another example, another type of garbage collector 502 is a partially concurrent collector that also attempts to compact reclaimed memory areas. The heap is partitioned into a set of equally sized heap regions, each a contiguous range of virtual memory. The partially concurrent collector performs a concurrent global marking phase to determine the liveness of objects throughout the heap. After the marking phase completes, the partially concurrent collector identifies regions that are mostly empty. The partially concurrent collector collects these regions first, which often yields a large amount of free space. The partially concurrent collector concentrates its collection and compaction activity on the areas of the heap that are likely to be full of reclaimable objects, that is, garbage. The partially concurrent collector copies objects from one or more regions of the heap to a single region on the heap, and in the process both compacts and frees up memory. This evacuation is performed in parallel on multiprocessors to decrease pause times and increase throughput.

The partially concurrent collector pauses the executing application during one or more stages of the garbage collection process. The partially concurrent collector pauses the executing application to copy live objects to new regions. Additionally or alternatively, the partially concurrent collector pauses the executing application to identify and mark objects that have been modified, as part of the execution of the program, since start of the initial marking. Additionally or alternatively, the partially concurrent collector pauses the executing application to perform a cleanup phase, including identifying empty regions and determining old regions that are candidates for the next collection.

Each GC thread is associated with a processing stack (such as processing stack 506a or 506b). As described above, a GC thread identifies live objects 516 by tracing through an object graph 512. The GC thread uses a processing stack to track the traversal of the object graph 512. The processing stack stores references to objects that (a) have been identified as part of the traversal process and (b) have not yet been processed in accordance with a set of garbage collection operations.

A processing stack has a limited number of entries. If a GC thread attempts to store an additional entry in a processing stack after the maximum number of entries has been reached, an error may be generated. Alternatively, if a GC thread attempts to store an additional entry in a processing stack after the maximum number of entries has been reached, the GC thread may allocate a new processing stack. In addition, each entry of the processing stack stores a limited number of bits. As an example, each entry may store a maximum of 64 bits.

Entries stored on a processing stack, which is associated with a particular GC thread, may be distributed to other GC threads for load balancing purposes. As an example, processing stack 506a of GC thread 504a may include ten entries. At the same time, processing stack 506b of GC thread 504b may include zero entries. Five entries from processing stack 506a may be distributed to GC thread 504b. GC thread 504b, rather than GC thread 504a, processes the entries distributed from processing stack 506a. As a result, each of GC thread 504a and GC thread 504b processes five entries. As illustrated in this example, the loads of GC thread 504a and GC thread 504b are balanced.

Figure 6:
FIG. 6 illustrates examples of references that may be stored on a marking stack, in accordance with an embodiment.
Figure 6:

In an embodiment, a processing stack concurrently stores multiple array chunk references corresponding to a same object array. Additionally or alternatively, a processing stack concurrently stores an array chunk reference and an ordinary reference. FIG. 6 illustrates examples of an ordinary reference 602 and an array chunk reference 604, which may be stored on a processing stack, in accordance with an embodiment.

In one or more embodiments, an ordinary reference 602 includes metadata and/or other bits 612, and address bits 616.

The address bits 616 store the memory address of the object being referenced. The memory address is a memory location within the heap 510. In an embodiment, the memory addresses of objects in the heap are aligned to a particular power of two. Since the memory addresses are aligned, some number of least significant bits (LSBs) in the memory addresses are always zero. The number of LSBs that are zero is equal to the particular power. As an example, the memory addresses of objects may be aligned to eight, which is two to the power of three ($2^3$). Valid aligned memory addresses include, for example, 00001000 (which is 8), 0010000 (which is 16), and 0011000 (which is 24). The last three bits of the aligned memory addresses are always zero.

The metadata and/or other bits 612 include information associated with the ordinary reference 602. As an example, metadata and/or other bits 612 may be used for storing flags and/or other metadata used during a garbage collection process. As another example, metadata and/or other bits 612 may include a first mark bit, a second mark bit, and a remap bit. A garbage collector may use the first mark bit and the second mark bit to mark live objects during a marking phase. A garbage collector may use the remap bit to manage the redirection of an object reference to an object that was moved to another memory location during the last garbage collection process. Further description of examples for using metadata bits 612 are included in U.S. Provisional Patent Application No. 62/307,062, filed Mar. 11, 2016, which is hereby incorporated by reference.

In one or more embodiments, an array chunk reference 604 includes chunk start bits 618, chunk length bits 620, and a chunk flag 622. Chunk start bits 618 store a compressed version of the memory address of the start of the array chunk. Chunk length bits 620 store a compressed version of a chunk length of an array chunk. Examples of operations for generating the chunk start bits and the chunk length bits 620 are described below with reference to FIGS. 10-11B.

A chunk flag 622 is used to indicate whether an item stored on a processing stack is an ordinary reference 602 or an array chunk reference 604. A chunk flag 622 of zero indicates that the item associated with the chunk flag 622 is an ordinary reference 602. Conversely, a chunk flag 622 of one indicates that the item associated with the chunk flag 622 is an array chunk reference 604.

A chunk flag 622 is the least significant bit (LSB) of an ordinary reference 602 or an array chunk reference 604. As described above, address bits 616 form the least significant bits of an ordinary reference 602. The address bits 616 store a memory address of an object stored in the heap. Due to an alignment of the memory addresses, some number of LSBs of memory addresses of objects stored in the heap are zero. Hence, the LSB of the address bits 616 (which is the chunk flag 622 of the ordinary reference 602) is equal to zero. In contrast, the LSB of an array chunk reference 604 (which is the chunk flag 622 of the array chunk reference 604) is set to one.

Due to various compressions in the chunk start bits 618 and the chunk length bits 620, the length of the array chunk reference 604 is within the maximum length of an entry on a processing stack. The maximum length of an entry on the processing stack may be the length of a machine word. The length of a machine word may be, for example, 64 bits. The length of an array chunk reference 604 may be the same as the length of an ordinary reference 602. Examples of operations for generating an array chunk reference 604 are described below with reference to FIGS. 8-11B.

Figure 7:
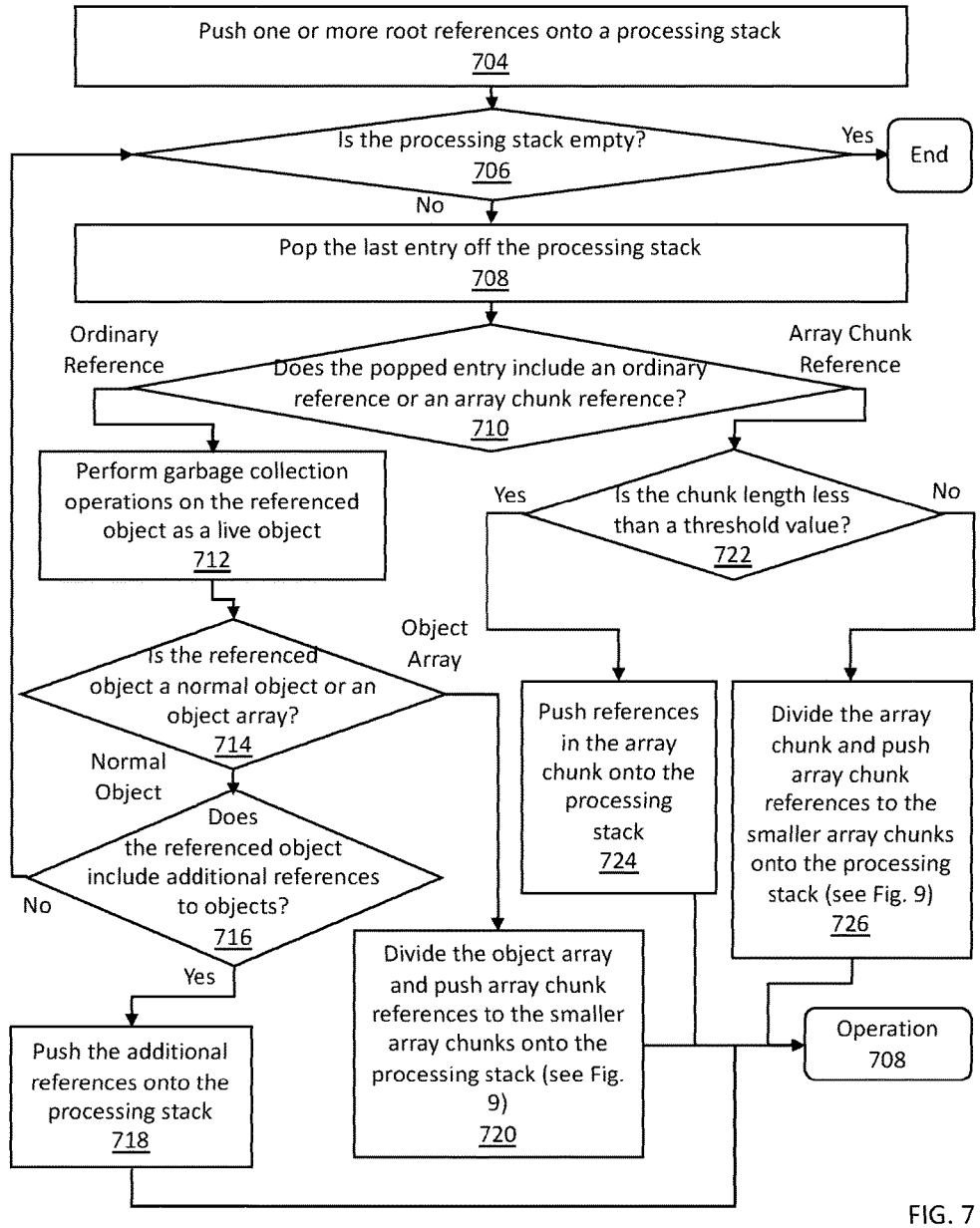
FIG. 7 illustrates an example set of operations for processing ordinary references and/or array chunk references during garbage collection, in accordance with an embodiment.

4. Performing Garbage Collection on an Object Array Using Array Chunk References FIG. 7 illustrates an example set of operations for processing ordinary references and/or array chunk references during garbage collection, in accordance with an embodiment.

One or more embodiments include pushing one or more root references onto a processing stack (Operation 704). A GC thread identifies the root references by analyzing registers, global fields, and stack frames. The GC thread pushes the root references onto the processing stack associated with the GC thread.

One or more embodiments include determining whether the processing stack is empty (Operation 706). If the processing stack is empty, then the process ends.

One or more embodiments include popping the last entry off the processing stack (Operation 708).

One or more embodiments include determining whether the popped entry includes an ordinary reference or an array chunk reference (Operation 710). The GC thread checks to see if the chunk flag (which is the least significant bit) of the popped entry is a one or a zero. If the chunk flag is a zero, then the popped entry includes an ordinary reference. If the chunk flag is a one, then the popped entry includes an array chunk reference.

If the popped entry includes an ordinary reference, then the GC thread performs GC operations on the referenced object as a live object (Operation 712). The GC operations performed depends on the type of GC being used. As an example, the GC operations of a copying collector include copying the live objects from a from-space to a to-space. As another example, the GC operations of a mark-and-sweep collector include marking the live objects with a "live" bit.

One or more embodiments include determining whether the referenced object is a normal object or an object array (Operation 714).

If the referenced object is a normal object, then the GC thread determines whether the referenced object includes additional references to objects (Operation 716). If the referenced object does not include additional references, then the GC thread has reached an end of the object graph. The thread returns to Operation 706 to determine whether the processing stack is empty.

If the referenced object includes additional references, then the GC thread pushes the additional references onto the processing stack (Operation 718).

Returning to Operation 714, if the referenced object is an object array, then the GC thread divides the object array and pushes array chunk references to the smaller array chunks onto the processing stack (Operation 720). Examples of detailed operations incorporated in Operation 720 are described below with reference to FIG. 9.

Returning to Operation 710, if the popped entry includes an array chunk reference to an array chunk, then the GC thread determines whether the chunk length of the array chunk reference is less than a threshold value (Operation 722).

If the chunk length is less than the threshold value, then the GC thread pushes the references in the array chunk onto the processing stack (Operation 724).

If the chunk length is not less than the threshold value, then the GC thread divides the array chunk and pushes array chunk references to the smaller array chunks onto the processing stack (Operation 726). Examples of detailed operations incorporated in Operation 726 are described below with reference to FIG. 9.

After Operation 718, 720, 724, or 726, the GC thread returns to Operation 708 to pop the last entry off the processing stack. The GC thread continues traversing the object graph until there are no more entries in the processing stack. When the processing stack is empty, the process ends.

Figure 8:
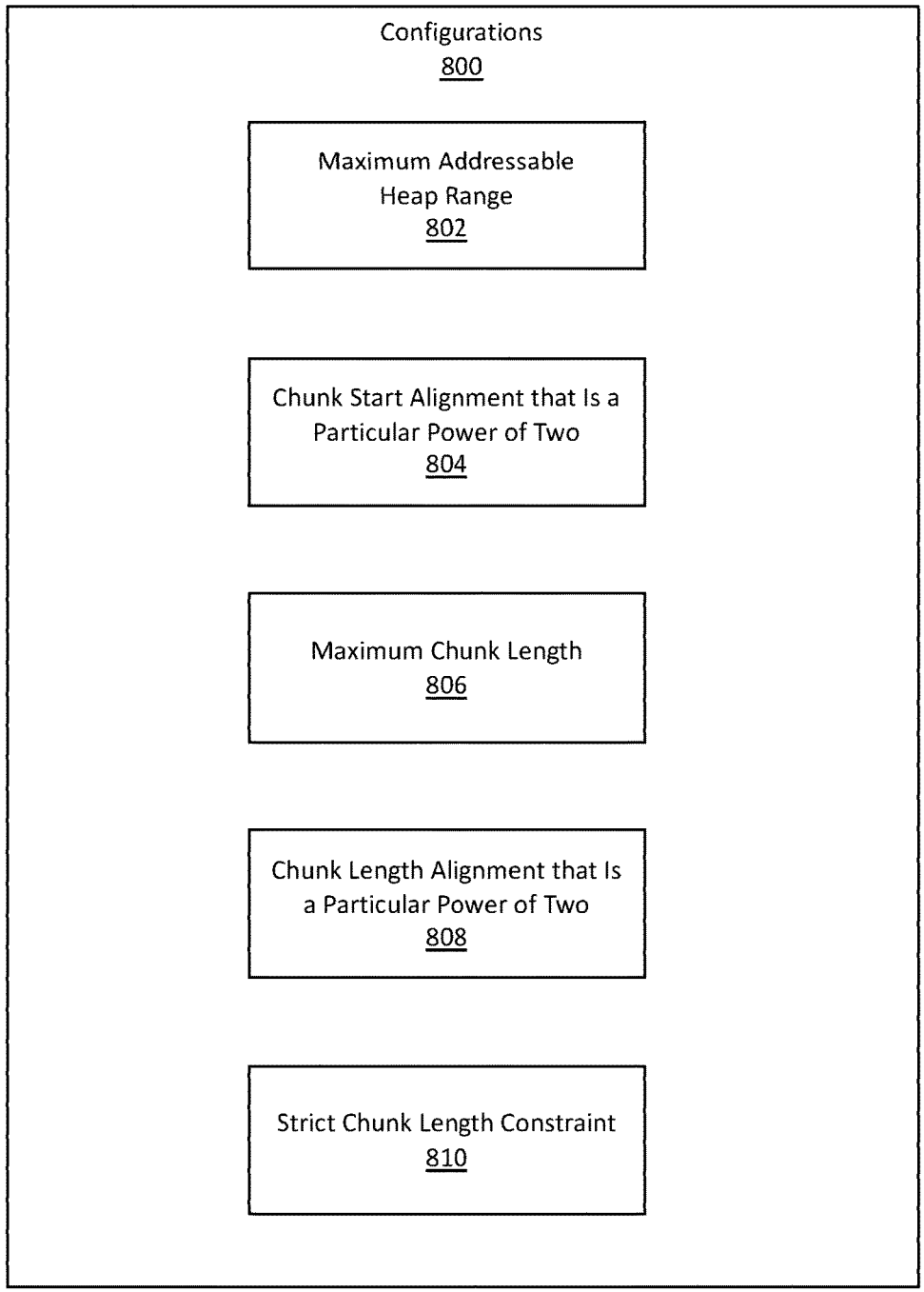
FIG. 8 illustrates examples of configurations that may be used in generating an array chunk reference, in accordance with an embodiment.

FIG. 8 illustrates examples of configurations that may be used in generating an array chunk reference, in accordance with an embodiment. The configurations 800 are set prior to performance of a garbage collection process, including the operations illustrated in FIG. 7. The configurations 800 are set based on user input and/or by another application.

The configurations 800 impose restrictions and/or constraints on the characteristics of an array chunk. An object array must be divided into array chunks in accordance with the restrictions and/or constraints, as further described below with reference to FIG. 9. Due to the configurations 800, various compressions may be performed on the memory address of a start of an array chunk and/or the chunk length of an array chunk. The compressions are used to generate an array chunk reference, as further described below with reference to FIGS. 10-11B.

One example configuration is a maximum addressable heap range 802. A maximum addressable heap range 802 is a maximum range of the heap. The heap may be a contiguous region within a memory space, or a set of non-contiguous regions within a memory space. If a virtual machine receives a request to allocate memory to an object beyond a maximum addressable heap range, an error may be generated.

A memory address of a start of a heap is referred to herein as a "heap base address." Remaining address locations within the heap may be identified as an offset from the heap base address. Given a particular maximum addressable heap range, the number of bits necessary to describe an offset from the heap base address is equal to the binary logarithm of the particular maximum addressable heap range. (If a result of the binary logarithm of the particular maximum addressable heap range is not an integer, then the result is rounded up. The number of bits necessary to describe an offset is equal to the rounded up result.)

Another example configuration is a chunk start alignment 804. The chunk start alignment is a particular power of two (such as, 1, 2, 4, 8, 16, 32, . . . ). An offset (from the heap base address) identifying a start of an array chunk must be aligned with the chunk start alignment 804. The offset must be equal to a multiple of the chunk start alignment 804. As an example, a chunk start alignment may be set to eight (which is two to the power of three). Valid aligned offsets may be multiples of eight (such as, 0, 8, 16, 24, . . . ). Alternatively, a memory address of a start of an array chunk must be aligned with the chunk start alignment 804. The memory address must be equal to a multiple of the chunk start alignment 804. As an example, a chunk start alignment may be eight (which is two to the power of three). Valid aligned memory addresses may be multiples of eight (such as, 0, 8, 16, 24, . . . ).

Given a particular chunk start alignment, a particular number, n, of LSBs in an aligned offset (or an aligned memory address) are always zero, wherein n is equal to the binary logarithm of the particular chunk start alignment. Hence, n LSBs of an aligned offset may be discarded in a compression process.

In an embodiment, a maximum of bits needed for the chunk start bits of an array chunk reference is determined based on the maximum addressable heap range and the chunk start alignment. The maximum number of bits needed for the chunk start bits is equal to the binary logarithm of the maximum addressable heap range minus the binary logarithm of the chunk start alignment.

Another example configuration is a maximum chunk length 806. A maximum chunk length 806 is a maximum length of an array chunk.

Given a particular maximum chunk length, a number of bits necessary to describe a chunk length is the binary logarithm of the particular maximum chunk length.

Another example configuration is a chunk length alignment 808. The chunk length alignment 808 is a particular power of two (such as, 1, 2, 4, 8, 16, 32, . . . ). The chunk length of an array chunk must be a multiple of the chunk length alignment 808. As an example, a chunk length alignment may be set to sixteen (which is two to the power of four). Valid chunk lengths are multiples of sixteen (such as, 16, 32, 48, . . . ).

Given a particular chunk length alignment, a particular number, n, of LSBs in a valid chunk length is always zero, wherein n is equal to the binary logarithm of the particular chunk length alignment. Hence, n LSBs of a valid chunk length may be discarded in a compression process.

In an embodiment, a maximum number of bits needed for the chunk length bits of an array chunk reference is determined based on the maximum chunk length and the chunk length alignment. The maximum number of bits needed for the chunk length bits is equal to the binary logarithm of the maximum chunk length minus the binary logarithm of the chunk length alignment.

Another example configuration is a strict chunk length constraint 810. The strict chunk length constraint 810 requires that the chunk length of an array chunk be equal to a power of two (such as, 1, 2, 4, 8, 16, 32, . . . ). Based on the strict chunk length constraint 810, the binary logarithm of the chunk length may be used as a compressed version of the chunk length. As an example, a chunk length, in compliance with the strict chunk length constraint, may be sixteen (which is two to the power of four ($2^4$)). A compressed version of the chunk length may be four. Another chunk length, in compliance with the strict length constraint, may be thirty-two (which is two to the power of five ($2^5$)). A compressed version of the chunk length may be five.

Given that the strict chunk length constraint is set, the maximum number of bits necessary to describe a chunk length is equal to the binary logarithm of the binary logarithm of the maximum chunk length. As an example, a maximum chunk length may be 1024, and a strict chunk length constraint may be set. Given the above restrictions, a particular array chunk may be associated with a chunk length of 1024. The chunk length may be compressed as a binary logarithm of the chunk length, which is ten. A number of bits necessary to express the number ten is the binary logarithm of ten, which is rounded up to four. As illustrated in this example, four bits are necessary to describe the chunk length under the strict chunk length constraint.

Figure 9:
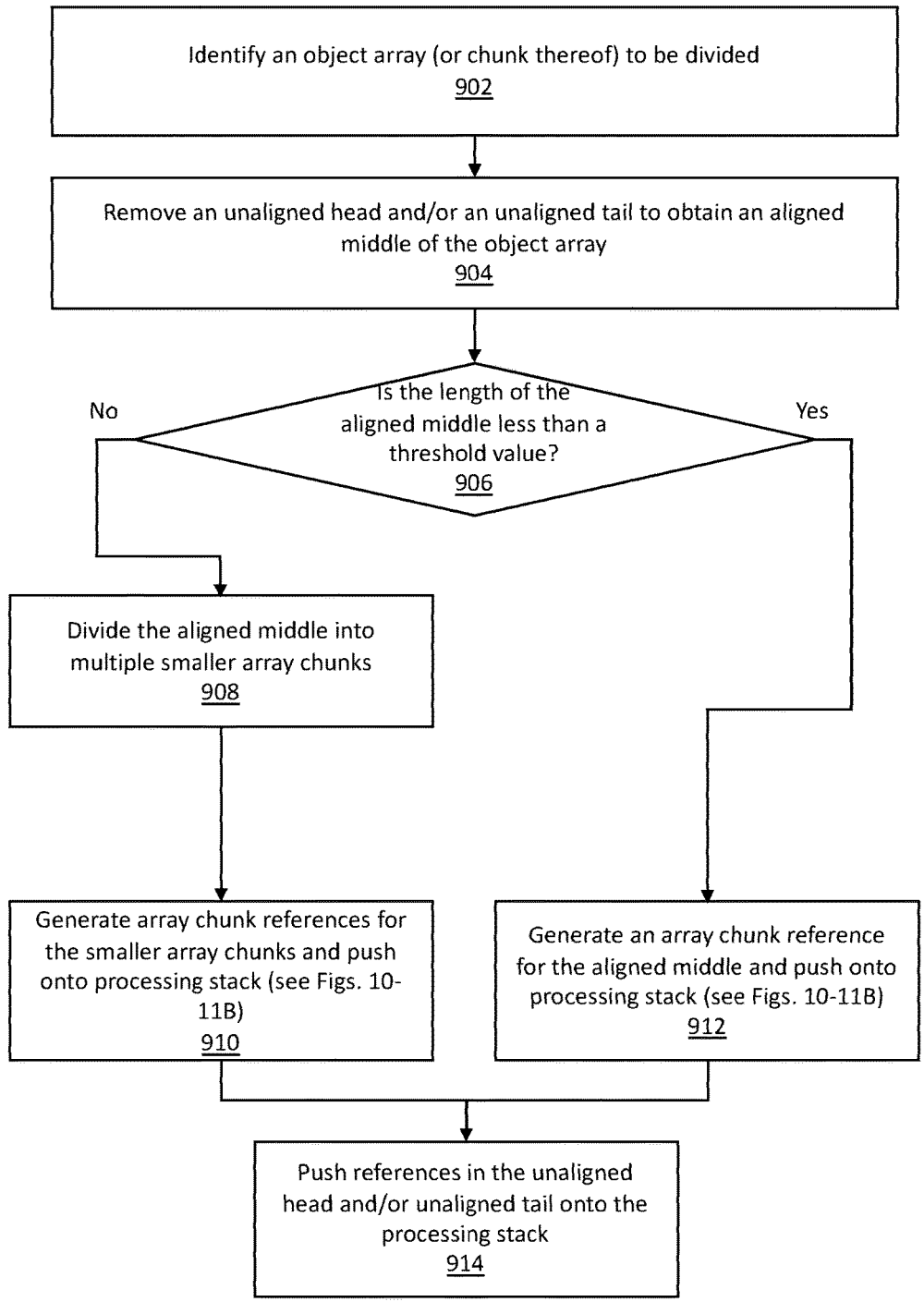
FIG. 9 illustrates an example set of operations for dividing an object array (or chunk thereof) and pushing array chunk references corresponding to the smaller array chunks onto a processing stack, in accordance with an embodiment.

FIG. 9 illustrates an example set of operations for dividing an object array (or array chunk thereof) and pushing array chunk references corresponding to the smaller array chunks onto a processing stack, in accordance with an embodiment.

One or more embodiments include identifying an object array (or array chunk thereof) to be divided (Operation 902). As an example, a GC thread may identify an object array as described above with reference to Operation 714 of FIG. 7. As another example, a GC thread may identify an array chunk as described above with reference to Operation 710 of FIG. 7.

One or more embodiments include removing an unaligned head and/or unaligned tail of the object array (or chunk thereof) (Operation 904). The GC thread removes the unaligned head and/or unaligned tail to obtain an aligned middle.

An unaligned head is a portion of an object array with the following characteristics: (a) a start of an unaligned head is the start of the object array, (b) the offset (or memory address) of the start of the unaligned head is not aligned with the chunk start alignment, and (c) the offset (or memory address) of an end of the unaligned head is the first offset (or memory address), associated with the object array, that is aligned with the chunk start alignment.

If a chunk length alignment is used, an unaligned tail is a portion of an object array with the following characteristics: (a) an end of an unaligned tail is the end of the object array, (b) a start of the unaligned tail is an end of a valid array chunk of the object array, and (c) a chunk length of the unaligned tail is not a multiple of the chunk length alignment.

Alternatively, if a strict chunk length constraint is used, an unaligned tail is a portion of an object array with the following characteristics: (a) an end of an unaligned tail is the end of the object array, (b) a start of the unaligned tail is an end of a valid array chunk of the object array, and (c) a chunk length of the unaligned tail is not equal to a power of two (the chunk length does not comply with the strict chunk length constraint).

The GC thread identifies the start of the object array. The GC thread determines whether the offset (or memory address) of the start of the object array is aligned with the chunk start alignment. If not, the GC thread determines the next offset (or memory address) that is aligned with the chunk start alignment. The GC thread identifies the unaligned head as the portion of the object array that is between (a) the start of the object array and (b) the next offset (or memory address) that is aligned with the chunk start alignment. The end of the unaligned head is the start of the aligned middle.

If a chunk length alignment is used, the GC thread identifies the end of the object array. The GC thread determines a difference between (a) an offset (or memory address) of the start of the aligned middle and (b) an offset (or memory address) of the end of the object array. The GC thread determines whether the difference is a multiple of the chunk length alignment. If not, the GC thread divides the difference by the chunk length alignment to determine a quotient. The GC thread multiplies the quotient by the chunk length alignment to determine a product. The GC thread adds the product to the offset (or memory address) of the start of the aligned middle to determine an end of the last valid array chunk. The GC thread identifies the unaligned tail as the portion of the object array that is between (a) the end of the last valid array chunk and (b) the end of the object array.

Alternatively, if a strict chunk length constraint is used, the GC thread first performs Operation 908, which is described below. Operation 908 includes dividing the object array into smaller array chunks. The GC thread determines a length of the last array chunk of the object array. The GC thread determines whether the length complies with the strict chunk length constraint. If not, the GC thread identifies the last array chunk as the unaligned tail.

One or more embodiments include determining whether the length of the aligned middle is less than a threshold value (Operation 906). The GC thread determines an offset (or memory address) of the start of the aligned middle. The GC thread determines an offset (or memory address) of the end of the aligned middle. The GC thread determines a difference between the two offsets (or memory addresses) as a length of the aligned middle. The GC thread determines whether the length is less than the threshold value.

If the length of the aligned middle is not less than a threshold value, then the GC thread divides the aligned middle into multiple smaller array chunks (Operation 908). Two or more smaller array chunks may be obtained. The smaller array chunks are divided such that the restrictions and/or constraints imposed by the configurations are satisfied.

In an embodiment, the GC thread divides the aligned middle in half. The first half of the aligned middle may be referred to as the "preceding array chunk." The latter half of the aligned middle may be referred to as the "succeeding array chunk."

The GC thread determines whether the following constraints are satisfied: (1) the start of the succeeding array chunk is a multiple of the chunk start alignment; (2) the length of the preceding array chunk is a multiple of the chunk length alignment (if a chunk length alignment is used); and/or (3) the length of the preceding array chunk complies with the strict chunk length constraint (if a strict chunk length constraint is used). If any of the above constraints is not satisfied, the GC thread adjusts the start of the succeeding array chunk, such that the constraints are satisfied. As an example, the GC thread may increment the offset (or memory address) of the start of the succeeding array chunk until all constraints are satisfied.

In alternative embodiments, the GC thread divides the aligned middle in half. The first half of the aligned middle may be referred to as the "preceding array chunk." The latter half of the aligned middle may be referred to as the "succeeding array chunk."

The GC thread additionally divides the preceding array chunk in half. Hence, the aligned middle is divided into four array chunks. The GC thread determines whether the constraints are satisfied for each of the array chunks. The GC thread adjusts the start of each array chunk, such that the constraints are satisfied.

In alternative embodiments, the GC thread may divide the aligned middle into any number of array chunks. The GC thread adjusts the start of each array chunk, such that the constraints are satisfied.

One or more embodiments include generating array chunk references for the smaller array chunks (Operation 910). The GC thread pushes the array chunk references onto the processing stack. Examples of detailed operations incorporated in Operation 910 are described below with reference to FIGS. 10-11B.

Returning to Operation 906, if the length of the aligned middle is less than the threshold value, then the GC thread generates an array chunk reference for the aligned middle (Operation 912). The thread pushes the array chunk reference onto the processing stack. Examples of detailed operations incorporated in Operation 910 are described below with reference to FIGS. 10-11B.

One or more embodiments include pushing references in the unaligned head and/or unaligned tail onto the processing stack (Operation 914). The GC thread identifies references in the unaligned head and/or unaligned tail. The references in the unaligned head and/or unaligned tail are ordinary references, which may point to a normal object or an object array. The GC thread pushes the references onto the processing stack.

Figure 10:
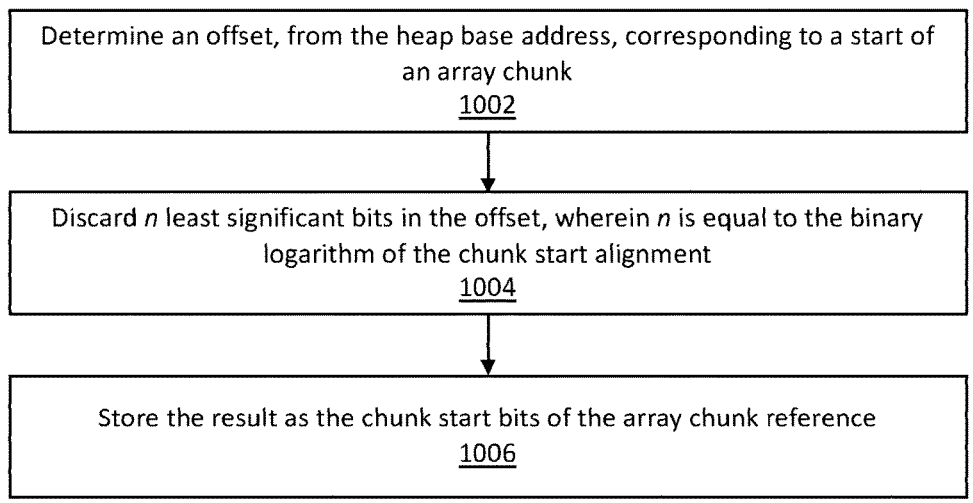
FIG. 10 illustrates an example set of operations for determining chunk start bits of an array chunk reference, in accordance with an embodiment.

FIG. 10 illustrates an example set of operations for determining chunk start bits of an array chunk reference to an array chunk, in accordance with an embodiment.

One or more embodiments include determining an offset, from a heap base address, corresponding to a start of an array chunk (Operation 1002). As an example, a memory address of a start of an array chunk may be 3,072. A heap base address may be 1,024. A GC thread may determine that an offset corresponding to the start of the array chunk is a difference between (a) the memory address of the start of the array chunk and (b) the heap base address, which is computed as 2,048.

One or more embodiments include discarding n least significant bits in the offset, wherein n is equal to the binary logarithm of the chunk start alignment (Operation 1004). As an example, a chunk start alignment may be set to eight (which is two to the power of three). The GC thread may compute the binary logarithm of the chunk start alignment, which is three. The GC thread may discard three LSBs in an offset corresponding to the start of an array chunk.

The following example illustrates discarding three LSBs in an offset, where the chunk start alignment is set to eight. An offset corresponding to the start of an array chunk may be 2,048. The offset of 2,048 complies with the chunk start alignment of eight. The offset of 2,048 is 100000000000 in binary form. As shown in this example, the three LSBs of the offset are equal to zero. The GC thread may discard three LSBs. After discarding three LSBs, the result may be 100000000. The result, 100000000, may be referred to as the compressed version of the memory address of the start of the array chunk.

One or more embodiments include storing the result as the chunk start bits of the array chunk reference (Operation 1006). The GC thread stores the result as the chunk start bits.

Figure 11A:
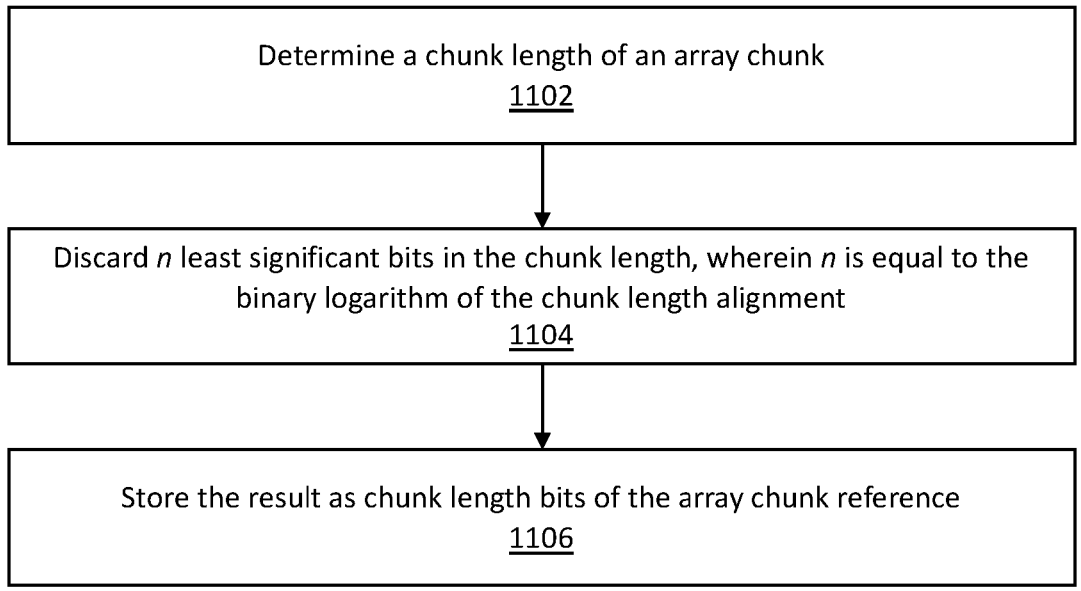
FIGS. 11A-B illustrate example sets of operations for determining chunk length bits of an array chunk reference, in accordance with an embodiment.
Figure 11B:
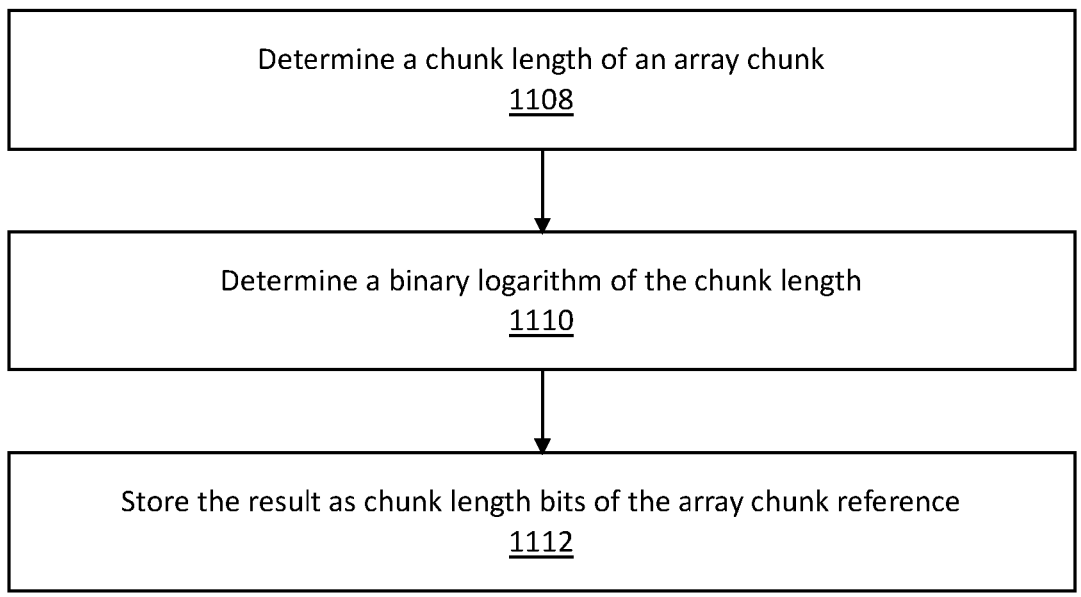

FIGS. 11A-11B illustrate example sets of operations for determining chunk length bits of an array chunk reference to an array chunk, in accordance with an embodiment.

FIG. 11A illustrates an example set of operations for determining chunk length bits where a chunk length alignment is set to a particular power of two.

One or more embodiments include determining a chunk length of an array chunk (Operation 1102). A GC thread determines an offset of a start of an array chunk and an offset of an end of the array chunk. The GC thread determines a difference between the two offsets as a chunk length of the array chunk.

One or more embodiments include discarding n least significant bits in the chunk length, wherein n is equal to the binary logarithm of the chunk length alignment (Operation 1104). As an example, a chunk length alignment may be set to sixteen (which is two to the power of four). The GC thread may compute the binary logarithm of the chunk length alignment, which is four. The GC thread may discard four LSBs of a chunk length.

The following example illustrates discarding four LSBs in a chunk length, where the chunk length alignment is set to sixteen. A chunk length of an array chunk may be 2,048. The chunk length of 2,048 complies with the chunk length alignment of sixteen. The chunk length of 2,048 is 100000000000 in binary form. As shown in this example, the four LSBs of the chunk length are equal to zero. The GC thread may discard four LSBs. After discarding four LSBs, the result may be 10000000. The result, 10000000, may be referred to as the compressed version of the chunk length of the array chunk.

One or more embodiments include storing the result as the chunk length bits of the array chunk reference (Operation 1106). The GC thread stores the result as the chunk length bits.

FIG. 11B illustrates an example set of operations for determining chunk length bits where a strict chunk length constraint is set.

One or more embodiments include determining a chunk length of an array chunk (Operation 1108). Examples of operations for determining the chunk length are described above with reference to Operation 1102.

One or more embodiments include determining a binary logarithm of the chunk length (Operation 1110). The GC thread computes the binary logarithm of the chunk length.

One or more embodiments include storing the result as the chunk length bits of the array chunk reference (Operation 1112). The GC thread stores the result as the chunk length bits.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

The following example illustrates performing garbage collection on an object array with the following restrictions and/or constraints: (a) a maximum addressable heap range is set to 32 TB, (b) a chunk start alignment is set to 4,096 (which is two to the power of twelve), and (c) a maximum chunk length is set to 1,073,741,824 (which is two to the power of thirty). Further, the maximum length of an array chunk reference is the length of a machine word, which is 64 bits.

Based on the above restrictions, the number of bits designated for the chunk start bits and the chunk length bits of an array chunk reference may be determined. The number of bits designated for the chunk start bits is the binary logarithm of the maximum addressable heap range minus the binary logarithm of the chunk start alignment. The binary logarithm of the maximum addressable range (32 TB) is forty-five. The binary logarithm of the chunk start alignment (4,096) is twelve. The difference is thirty-three. Hence, thirty-three bits are designated for the chunk start bits.

The number of bits designated for the chunk length bits is the binary logarithm of the maximum chunk length. The binary logarithm of the maximum chunk length is thirty. Hence, thirty bits are designated for the chunk length bits.

Accordingly, an array chunk reference includes thirty-three chunk start bits, thirty chunk length bits, and one bit for a chunk flag. The chunk start bits, chunk length bits, and chunk flag are represented by a total of 64 bits.

Figure 12A:
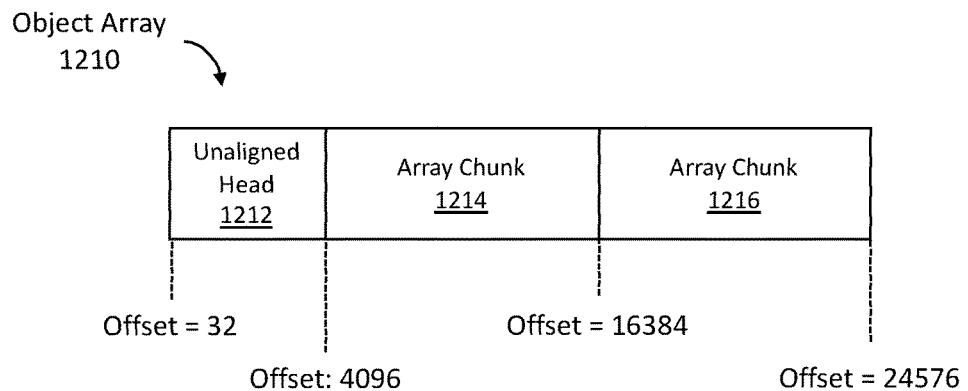
FIG. 12A illustrates an example of an object array to be processed by a garbage collection process, in accordance with an embodiment.

FIG. 12A illustrates an example of an object array to be processed by a garbage collection process, in accordance with an embodiment. As illustrated, an offset corresponding to a start of the object array 1210 is 32. An offset corresponding to an end of the object array 1210 is 24,576.

A GC thread determines that the length of the object array 1210 is 24,544. The GC thread determines that the length is greater than a specified threshold value. Since the length is greater than the specified threshold value, the GC thread proceeds to divide the object array 1210 into array chunks.

The GC thread determines that the offset corresponding to the start of the object array 1210 does not align with the chunk start alignment. The GC thread determines that a next offset that aligns with the chunk start alignment is 4,096. Hence, the GC thread determines that a portion of the object array 1210, starting at the offset 32 and ending at the offset 4,095, is an unaligned head 1212. The GC thread determines that a portion of the object array 1210, starting at the offset 4,096 and ending at the offset 24,576, is an aligned middle.

The GC thread determines a length of the aligned middle of the object array 1210. The length is computed as 20,480. The GC thread determines that the length is greater than a specified threshold value. Since the length is greater than the specified threshold value, the GC thread proceeds to divide the aligned middle into smaller array chunks.

The GC thread divides the length of the aligned middle by two, which computes to 10,240. The GC thread adds 10,240 to the offset of the start of the aligned middle, which computes to 14,336. The GC thread identifies a portion of the object array 1210, starting from the offset 4,096 and ending at the offset 14,335, as a temporary preceding array chunk. The GC thread identifies a portion of the object array 1210, starting from the offset 14,336 and ending at the offset 24,576, as a temporary succeeding array chunk. The GC thread determines that the offset of the start of the temporary succeeding array chunk is not aligned with the chunk start alignment.

The GC thread adjusts the start of each array chunk, such that the constraints are satisfied. The GC thread finds a next offset that is aligned with the chunk start alignment. The next offset that is aligned with the chunk start alignment is 16,384. The GC thread adjusts the start of the temporary succeeding array to be equal to 16,384. Hence, the object array is divided into array chunk 1214 and array chunk 1216. The array chunk 1214 starts at offset 4,096 and ends at offset 16,383. The array chunk 1216 starts at offset 16,384 and ends at 24,576.

Figure 12B:
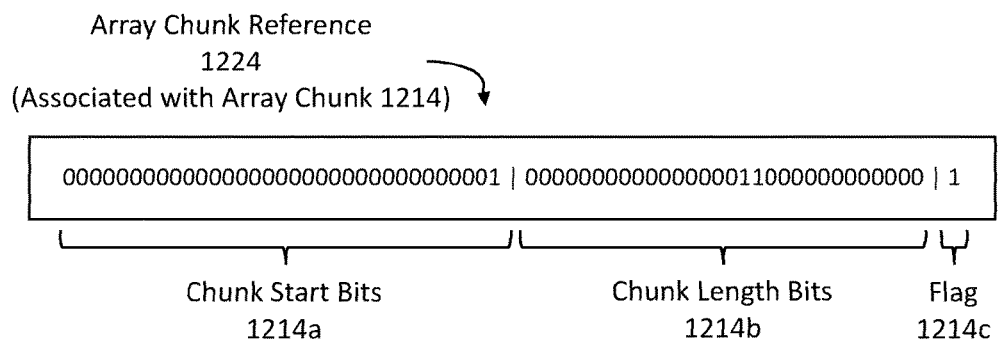
FIGS. 12B-C illustrate examples of array chunk references to array chunks of an object array, in accordance with an embodiment.
Figure 12C:
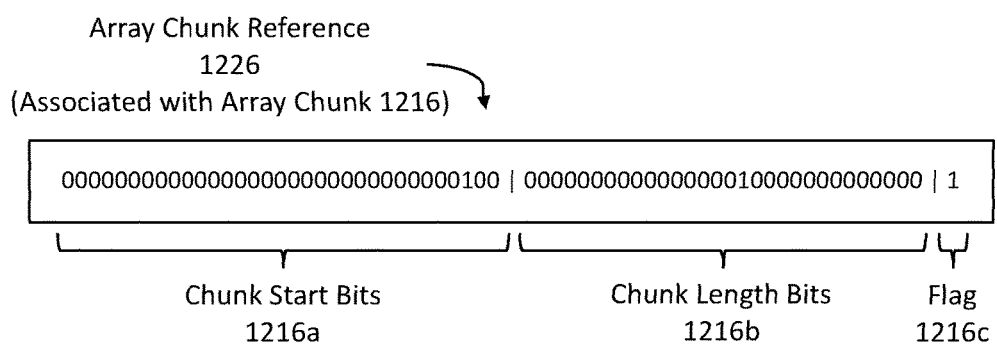

FIGS. 12B-C illustrate examples of array chunk references to array chunks of an object array, in accordance with an embodiment.

As illustrated, the GC thread determines an array chunk reference 1224, associated with the array chunk 1214. The GC thread determines the chunk start bits 1214a of the array chunk reference 1224. The GC thread determines that an offset corresponding to the start of the array chunk 1214 is 4,096. Expressed as a binary number, the offset corresponding to the start of the array chunk 1214 is 1000000000000. Since the binary logarithm of the chunk start alignment is twelve, the GC thread discards twelve LSBs. The GC thread pads the result with leading zeroes to obtain a thirty-three-bit binary number, which is 000000000000000000000000000000001. The GC thread stores the result, which is the compressed version of the memory address of the start of the array chunk 1214, as the chunk start bits 1214a.

Additionally, the GC thread determines the chunk length bits 1214b of the array chunk reference 1224. The GC thread determines that the chunk length of the array chunk 1214 is 12,288. Expressed as a thirty-bit binary number, the chunk length of the array chunk 1214 is 000000000000000011000000000000. The GC thread stores the result as the chunk length bits 1214b.

Additionally, the GC thread sets the chunk flag 1214c of the array chunk reference 1224 to one.

Further, as illustrated, the GC thread determines an array chunk reference 1226, associated with the array chunk 1216. The GC thread determines the chunk start bits 1216a of the array chunk reference 1226. The GC thread determines that an offset corresponding to the start of the array chunk 1216 is 16,384. Expressed as a binary number, the offset corresponding to the start of the array chunk 1216 is 100000000000000. Since the binary logarithm of the chunk start alignment is twelve, the GC thread discards twelve LSBs. The GC thread pads the result with leading zeroes to obtain a thirty-three-bit binary number, which is 000000000000000000000000000000100. The GC thread stores the result, which is the compressed version of the memory address of the start of the array chunk 1216, as the chunk start bits 1216a.

Additionally, the GC thread determines the chunk length bits 1216b of the array chunk reference 1226. The GC thread determines that the chunk length of the array chunk 1216 is 8,192. Expressed as a thirty-bit binary number, the chunk length of the array chunk 1216 is 000000000000000010000000000000. The GC thread stores the result as the chunk length bits 1216b.

Additionally, the GC thread sets the chunk flag 1216c of the array chunk reference 1226 to one.

Figure 12D:
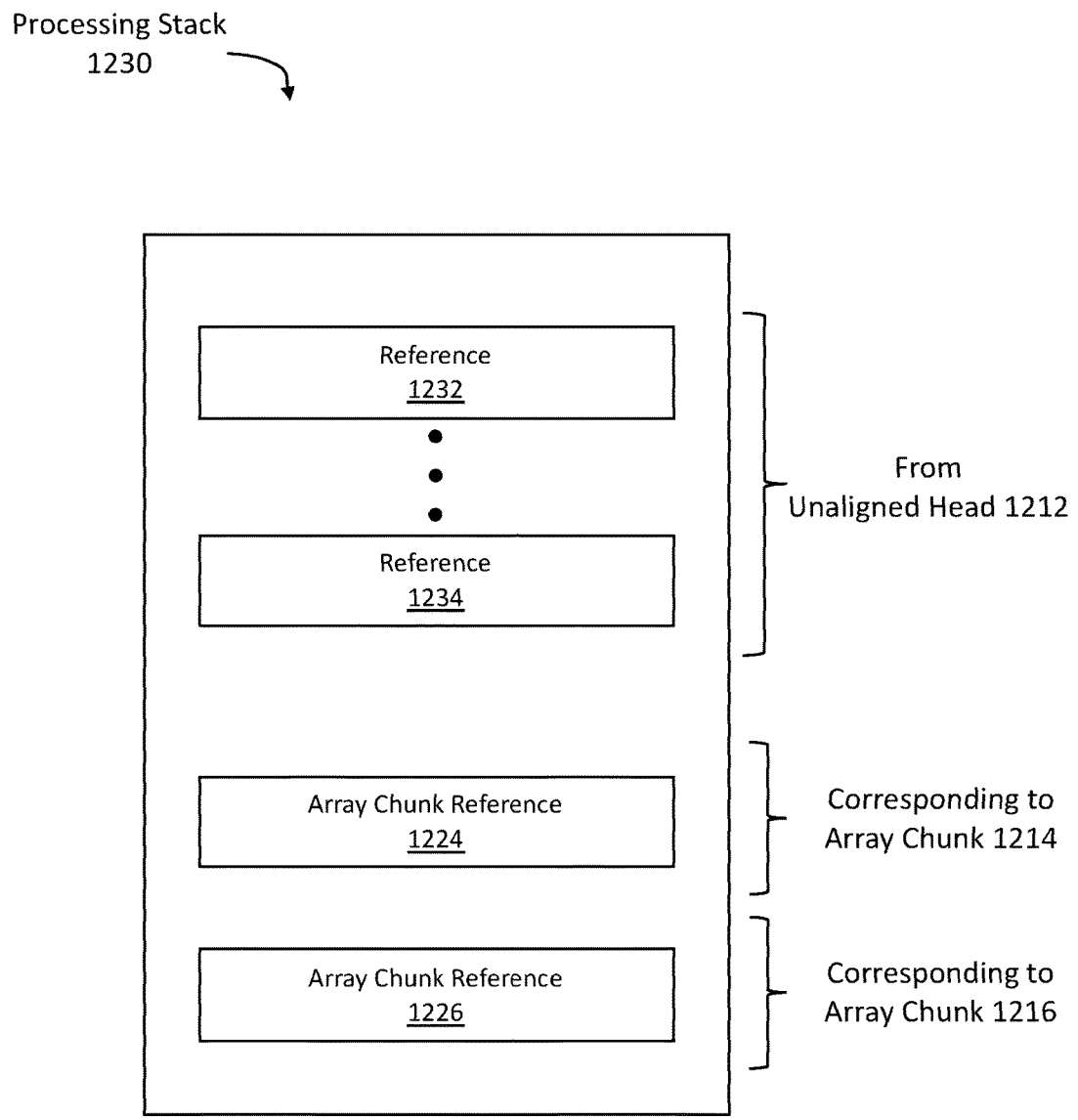
FIG. 12D illustrates examples of entries in a processing stack associated with a garbage collector thread, in accordance with an embodiment.

FIG. 12D illustrates examples of entries in a processing stack associated with a garbage collector thread, in accordance with an embodiment.

The GC thread pushes the array chunk reference 1226 and the array chunk reference 1224 onto a processing stack 1230. As described above, the array chunk reference 1226 corresponds to the array chunk 1216. The array chunk reference 1224 corresponds to the array chunk 1214.

Additionally, the GC thread identifies references included in the unaligned head 1212. As an example, references 1232-1234 are included in the unaligned head 1212. Each of references 1232-1234 is an ordinary reference to either normal objects or object arrays. Each of references 1232-1234 includes a chunk flag that is equal to zero. The GC thread pushes the references 1232-1234 onto the processing stack 1230.

Hence, the processing stack 1230 concurrently stores the references 1232-1234, the array chunk reference 1224, and the array chunk reference 1226. As illustrated, the processing stack 1230 concurrently stores multiple array chunk references 1224-1226. The references 1232-1234 and the array chunk references 1224-1226 may be distributed to other GC threads for processing. The references 1232-1234 and the array chunk references 1224-1226 may be distributed to other GC threads for the purpose of balancing loads across GC threads.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
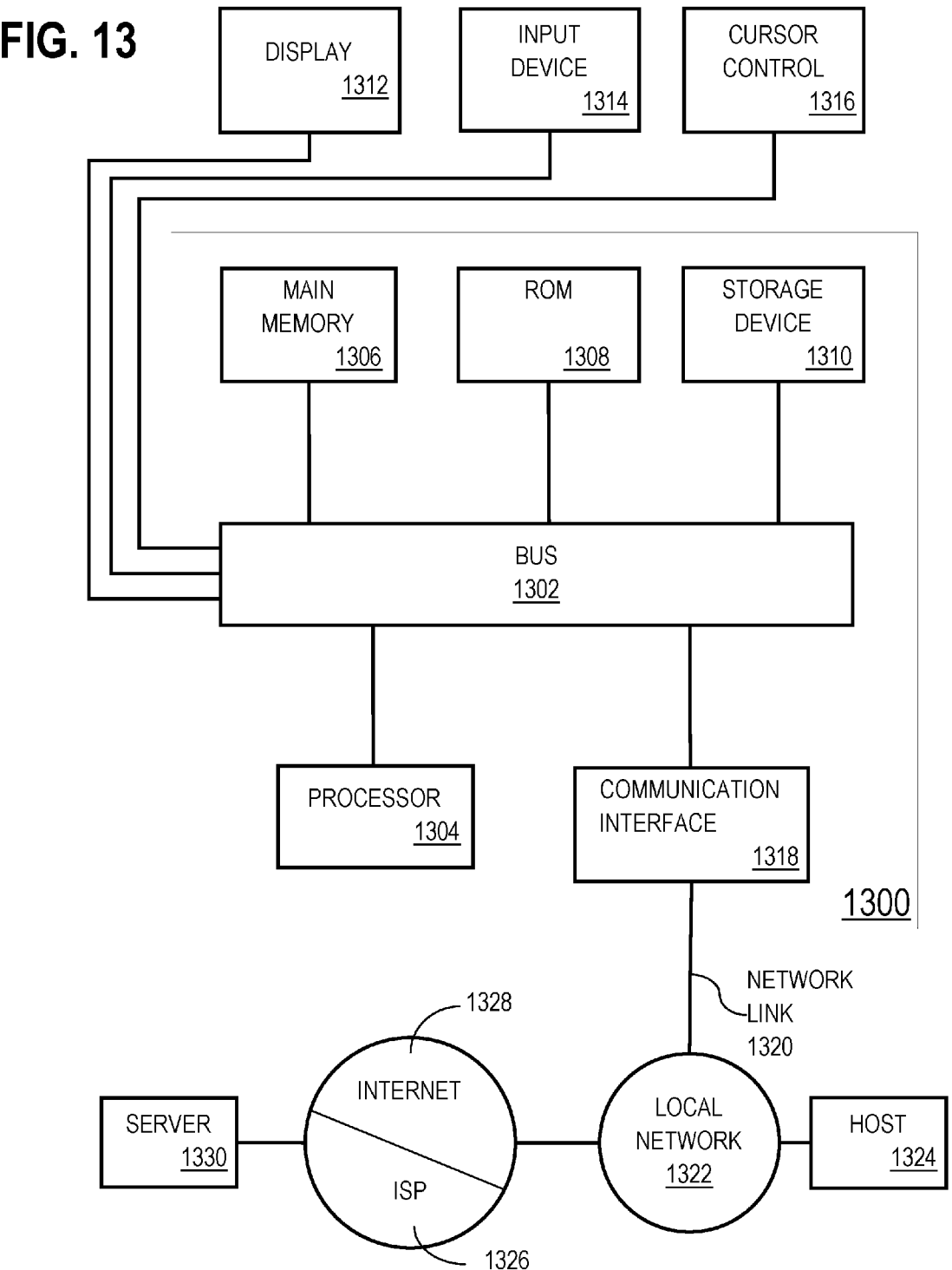
FIG. 13 illustrates a system in accordance with one or more embodiments.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    dividing an object array into a plurality of array chunks to be processed by a garbage collection process;
    generating a plurality of array chunk references corresponding respectively to the plurality of array chunks;
    pushing a first array chunk reference, of the plurality of array chunk references, onto a processing stack associated with the garbage collection process, wherein the first array chunk reference corresponds to a first array chunk of the plurality of array chunks; and
    while the first array chunk reference is stored on the processing stack, pushing a second array chunk reference, of the plurality of array chunk references, onto the processing stack associated with the garbage collection process, wherein the second array chunk reference corresponds to a second array chunk of the plurality of array chunks.

2. The medium of claim 1, wherein the operations further comprise:
    removing, by the garbage collection process, the second array chunk reference from the processing stack; and
    processing, by the garbage collection process, the second array chunk corresponding to the second array chunk reference.

3. The medium of claim 1, wherein the first array chunk reference is maintained on the processing stack while the second array chunk reference is removed from the processing stack.

4. The medium of claim 1, wherein the processing stack corresponds to a first thread of the garbage collection process, and at least one of the plurality of array chunk references is distributed to a second thread of the garbage collection process for processing by the second thread of the garbage collection process.

5. The medium of claim 1, wherein the operations further comprise:
    distributing the first array chunk reference, of the plurality of array chunk references, to a first thread of the garbage collection process; and
    distributing the second array chunk reference, of the plurality of array chunk references, to a second thread of the garbage collection process,
    wherein a first time period used by the first thread to process the first array chunk reference overlaps with a second time period used by the second thread to process the second array chunk reference.

6. The medium of claim 1, wherein each of the plurality of array chunk references comprises: (a) chunk start bits representing a memory address of a start of a corresponding array chunk, and (b) chunk length bits representing a chunk length of the corresponding array chunk.

7. The medium of claim 6, wherein the operations further comprise:
    obtaining a maximum addressable range for a run-time data area from which memory for normal objects and object arrays is allocated, such that a number of bits designated for the chunk start bits is equal to or less than a binary logarithm of the maximum addressable range.

8. The medium of claim 7, wherein the operations further comprise:
    obtaining a chunk start alignment that requires a start of an array chunk to be aligned to a fixed power of two, such that the number of bits designated for the chunk start bits is equal to the binary logarithm of the maximum addressable range minus the fixed power.

9. The medium of claim 6, wherein the operations further comprise:
    obtaining a maximum chunk length, such that a number of bits designated for the chunk length bits is equal to or less than a binary logarithm of the maximum chunk length.

10. The medium of claim 9, wherein the operations further comprise:
    obtaining a chunk length alignment that requires a chunk length to be a multiple of a fixed power of two, such that the number of bits designated for the chunk length bits is equal to the binary logarithm of the maximum chunk length minus the fixed power.

11. The medium of claim 9, wherein the operations further comprise:
    obtaining a strict chunk length alignment requirement that requires a chunk length to be a power of two, such that the number of bits designated for the chunk length bits is equal to a binary logarithm of the binary logarithm of the maximum chunk length.

12. The medium of claim 6, wherein dividing the object array into the plurality of array chunks comprises:
- determining that a first memory address of a start of the object array is not aligned with a chunk start alignment, wherein the chunk start alignment is a fixed power of two;
- determining a second memory address that is aligned with the chunk start alignment;
- identifying a first portion of the object array, that starts from the first memory address and ends at the second memory address, as an unaligned head; and
- dividing a second portion of the object array, that does not include the unaligned head, into the plurality of array chunks.

13. The medium of claim 12, wherein the operations further comprise:
- while the plurality of array chunk references are stored on the processing stack, pushing one or more references included in the unaligned head onto the processing stack.

14. The medium of claim 6, wherein dividing the object array into the plurality of array chunks comprises:
- determining a first memory address of an end of an array chunk of the object array;
- determining a second memory address of an end of the object array;
- determining that a difference between the second memory address and the first memory address is not a multiple of a chunk length alignment;
- identifying a first portion of the object array, that starts from the first memory address and ends at the second memory address, as an unaligned tail; and
- dividing a second portion of the object array, that does not include the unaligned tail, into the plurality of array chunks.

15. The medium of claim 1, wherein the processing stack further stores an ordinary reference, and the ordinary reference references a second object array or a normal object.

16. The medium of claim 15, wherein a first length of each of the plurality of array chunk references is same as a second length of the ordinary reference.

17. The medium of claim 1, wherein the operations further comprise:
- while the plurality of array chunk references are stored on the processing stack, pushing an ordinary reference, to a normal object, onto the processing stack.

18. The medium of claim 1, wherein each of the plurality of array chunk references further comprises a chunk flag that indicates whether an item stored on the processing stack is an array chunk reference or an ordinary reference.

19. The medium of claim 1, wherein the operations further comprise:
- dividing the first array chunk into a second plurality of array chunks;
- generating a second plurality of array chunk references corresponding respectively to the second plurality of array chunks; and
- while at least one of the plurality of array chunk references is stored on the processing stack, pushing at least one of the second plurality of array chunk references onto the processing stack.

20. A method, comprising:
- dividing an object array into a plurality of array chunks to be processed by a garbage collection process;
- generating a plurality of array chunk references corresponding respectively to the plurality of array chunks;
- pushing a first array chunk reference, of the plurality of array chunk references, onto a processing stack associated with the garbage collection process, wherein the first array chunk reference corresponds to a first array chunk of the plurality of array chunks; and
- while the first array chunk reference is stored on the processing stack, pushing a second array chunk reference, of the plurality of array chunk references, onto the processing stack associated with the garbage collection process, wherein the second array chunk reference corresponds to a second array chunk of the plurality of array chunks, wherein the method is performed by at least one device including a hardware processor.

21. A system, comprising:
at least one device including a hardware processor; and
the system configured to perform operations comprising:
- dividing an object array into a plurality of array chunks to be processed by a garbage collection process;
- generating a plurality of array chunk references corresponding respectively to the plurality of array chunks;
- pushing a first array chunk reference, of the plurality of array chunk references, onto a processing stack associated with the garbage collection process, wherein the first array chunk reference corresponds to a first array chunk of the plurality of array chunks; and
- while the first array chunk reference is stored on the processing stack, pushing a second array chunk reference, of the plurality of array chunk references, onto the processing stack associated with the garbage collection process, wherein the second array chunk reference corresponds to a second array chunk of the plurality of array chunks.

* * * * *

UNITED STATES PATENT AND TRADEMARK OFFICE
CERTIFICATE OF CORRECTION

PATENT NO. : 10,067,867 B2
APPLICATION NO. : 15/267660
DATED : September 4, 2018
INVENTOR(S) : Karlsson et al.

Page 1 of 1

It is certified that error appears in the above-identified patent and that said Letters Patent is hereby corrected as shown below:

In the Drawings

On sheet 2 of 14, in FIG. 2, under Reference Numeral 200, Line 1, delete "Fie" and insert -- File --, therefor.

In the Specification

In Column 7, Line 48, delete "add 12and 13" and insert -- add12and13 --, therefor.

In Column 7, Line 50, delete "add 12and 13" and insert -- add12and13 --, therefor.

Signed and Sealed this
Sixteenth Day of July, 2019

Andrei Iancu
*Director of the United States Patent and Trademark Office*